July 8, 1941. C. L. WATERHOUSE, JR 2,248,319
METAL BODY FOR MOTOR VEHICLES
Filed March 18, 1939    12 Sheets-Sheet 2

Inventor
Charles L. Waterhouse Jr.
By
Attorneys

July 8, 1941.   C. L. WATERHOUSE, JR   2,248,319
METAL BODY FOR MOTOR VEHICLES
Filed March 18, 1939   12 Sheets-Sheet 3

Inventor
Charles L. Waterhouse Jr.
Blackmore, Spencer & Flint
Attorneys

July 8, 1941. C. L. WATERHOUSE, JR 2,248,319
METAL BODY FOR MOTOR VEHICLES
Filed March 18, 1939 12 Sheets-Sheet 4

Inventor
Charles L. Waterhouse Jr.
By Blackmore, Spencer & Flint
Attorneys

July 8, 1941. C. L. WATERHOUSE, JR 2,248,319
METAL BODY FOR MOTOR VEHICLES
Filed March 18, 1939 12 Sheets-Sheet 6

Inventor
Charles L. Waterhouse Jr.
By Blackmore, Spencer & Hiett
Attorneys July 8, 1941.          C. L. WATERHOUSE, JR          2,248,319
                    METAL BODY FOR MOTOR VEHICLES
                Filed March 18, 1939       12 Sheets-Sheet 9

Inventor
Charles L. Waterhouse Jr.
By
Blackmore, Spencer & Clink
Attorneys

July 8, 1941.  C. L. WATERHOUSE, JR  2,248,319
METAL BODY FOR MOTOR VEHICLES
Filed March 18, 1939  12 Sheets-Sheet 11

Inventor
Charles L. Waterhouse Jr.
By
Blackmore, Sewert & Shuil
Attorneys

July 8, 1941.  C. L. WATERHOUSE, JR  2,248,319
METAL BODY FOR MOTOR VEHICLES
Filed March 18, 1939  12 Sheets-Sheet 12

Inventor
Charles L. Waterhouse Jr.

Attorneys

Patented July 8, 1941

2,248,319

UNITED STATES PATENT OFFICE 2,248,319

METAL BODY FOR MOTOR VEHICLES

Charles L. Waterhouse, Jr., Dearborn, Mich., assignor to General Motors Corporation, Detroit, Mich., a corporation of Delaware Application March 18, 1939, Serial No. 262,605

9 Claims. (Cl. 296—28)

This invention relates to metal automobile bodies, particularly of the type in which no underframe or chassis is used but the body and the understructure thereof are built sufficiently strong so that the body is self-sustaining and does not require the support of the usual chassis or frame.

The particular novelty of the invention resides particularly: (1) in the construction of the roof made integral with the top of the cowl, the windshield, and a portion of the rear quarter panel; (2) in the manner of attaching a short front frame section to the underframe; (3) in the manner of bracing the underframe to the front pillars; (4) in the structure of the front door pillar and the inside panel and the interassociation of the two; (5) in the top side rail over the vehicle doors; (6) in the rear of the body comprising the side panels, underframe, and seat back supports; (7) in the rear door post; (8) in the various details of the underpan; (9) a novel door; (10) in a number of other details of construction.

The interrelation of these various novel details results in a commercially adaptable body which has proved successful in use.

Referring to the drawings, the metal automobile body is indicated as a whole at 2 and comprises in general the top construction 4 (which includes the windshield 6 and the cowl top 8 and the rear quarter part 10), the cowl sides 12, center post 14, rear side panels 16, the underpan 18, and the front frame 20.

Figures 29, 30:
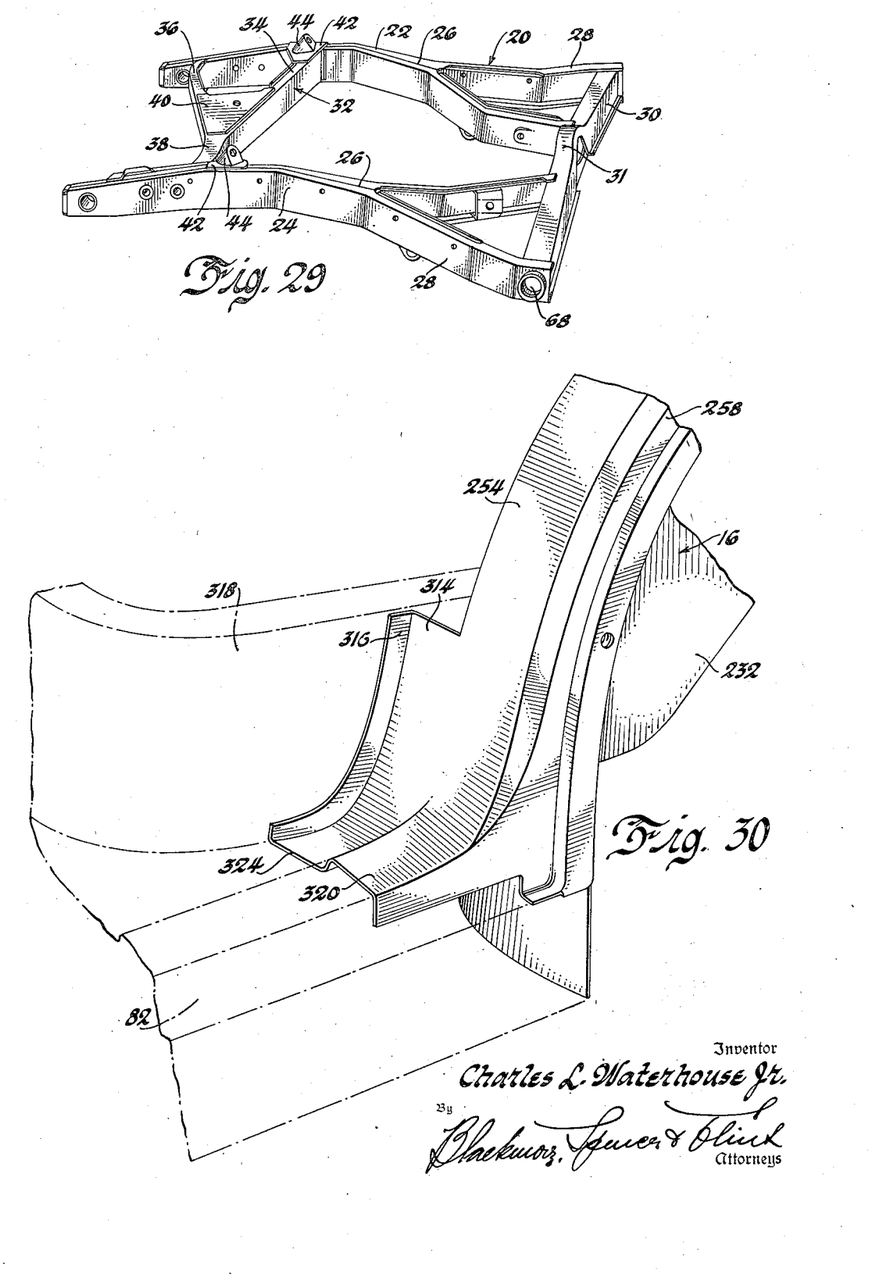
Figure 29 is a perspective view of a short frame at the front of the vehicle body.
Figure 30 is a view of the corner construction at the wheel housing where the rear door post joins the underpan.

The front frame is shown in detail in Figure 29 and comprises the side elements 22 and 24 each of which is composed of two channel members facing each other and welded together on the line 26 to form a box-sectioned construction. The rear of each side element is spread apart to form a two-tined fork 28 and the four tines are united at their rear ends by the channel cross piece 30. The channel is centrally arched as at 31 to accommodate the transmission and propeller shaft. At the front the side members 22 and 24 are united by transverse member 32 which in turn is composed of the individual transverse elements 34 and 36 which are fork shaped at their ends where they join onto the side members 22 and 24 and are rigidly connected to each other at their middles as indicated at 38. Suitable plates 40 are used to connect the spaced ends of the transverse members 34 and 36. The structure of the transverse brace 32 is designed to strengthen the frame and to serve as a front mount for the usual engine suspension.

At each side of the front frame where the transverse member 32 joins onto the side bars 22 and 24, two brackets 42 are secured. These brackets have an upwardly extending part 44 provided with an opening for the reception of a cylindrical spacer 46 in which there is received a bolt 48. Rubber washers 50 are positioned inside and outside the end of the upwardly extending part 44 on opposite sides of the opening and a metal washer 52 is positioned over the inner rubber washer 50. Over the outer rubber washer 50 there is positioned the metal disc 54 secured to and forming the end of a tube 56 and to this disc 54 the nut 58 may be secured as by welding. By tightening the bolt 48 into the nut 58 the end of the tube will be resiliently held on the bracket 42 attached to the frame. There is one tube 56 at each side of the vehicle. The tubes 56 extend upwardly at an angle and pass through the cowl pan or dash panel 60 where they are mounted in bracket 62 rigidly secured to the dash panel. The upper end of the tube is flattened and bent as indicated at 64 and this flattened end is welded to the front door pillar indicated as a whole at 66.

Figures 1, 2, 3, 4, 5:
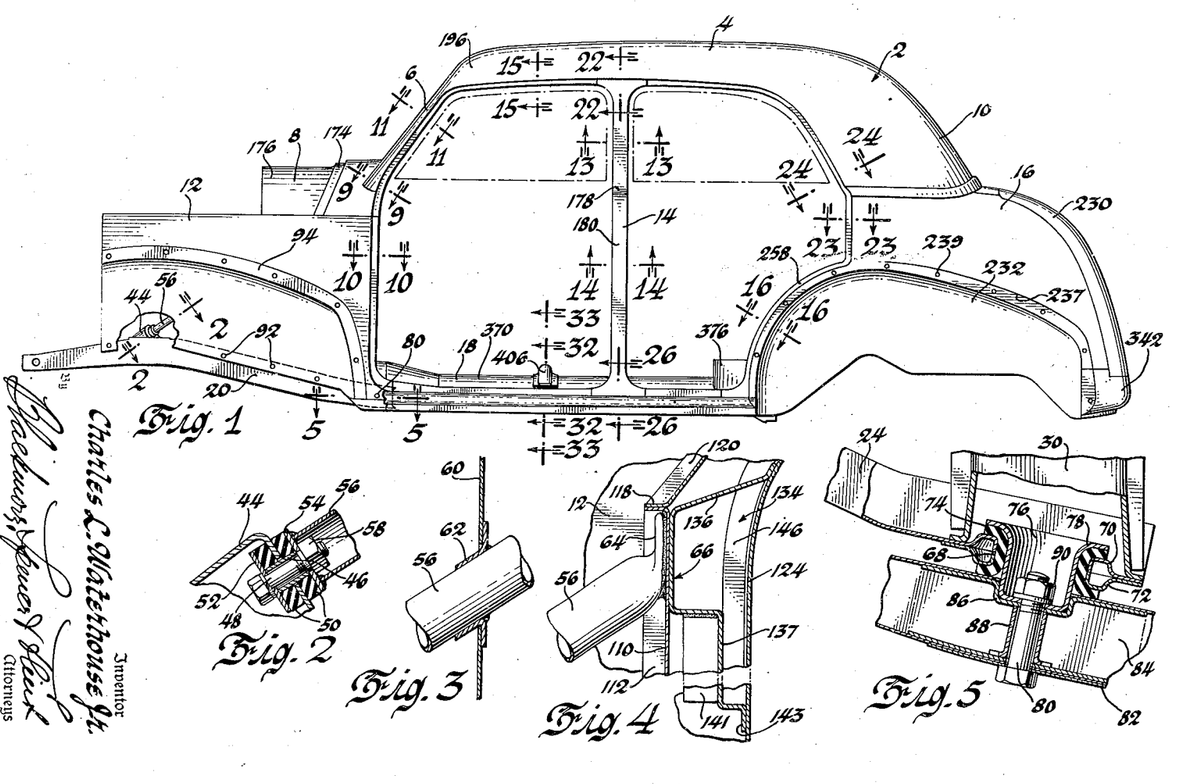
Figure 1 is a side view of the body with the doors omitted and with a part broken away better to show a detail of construction.
Figure 2 is a sectional detail on the line 2—2 of Figure 1.
Figures 3 and 4 are sectional details on the corresponding lines of Figure 12.
Figure 5 is a sectional detailed view on the line 5—5 of Figure 1.

The frame 20 at the rear cross member has the opening 68 (Figures 5 and 29). This opening 68 is formed by suitably shaping the web of the side members 22 and 24 as indicated at 70. A correspondingly shaped piece 72 is secured to the outside of the side members 22 and 24 to form a thickened edge on the opening. In this opening there is received the rubber spool 74 and passing through the spool and the opening there is positioned the metal cup 76 having the flared edge 78 which rests on the edge of the rubber spool 74. The bottom of the cup 76 has an opening for the reception of a bolt 80 which passes through the front end of the side sill 82 of the underpan 18. This side sill 82 has positioned therein the reinforcing bracket 84 having an indented part 86 to receive the end of the cup 76. A spacing cylinder 88 is positioned between the sides of the bracket 84 and the bolt 80 passes through suitable openings in the sill, the bracket, and through the spacer 88. A nut 90 screwed onto the bolt rigidly holds the cup 76 in the recess 86. There is one connection, such as shown in Figure 5, at each side of the vehicle and this connection serves as a resilient connection between the front frame and the underpan.

Figures 6, 7:
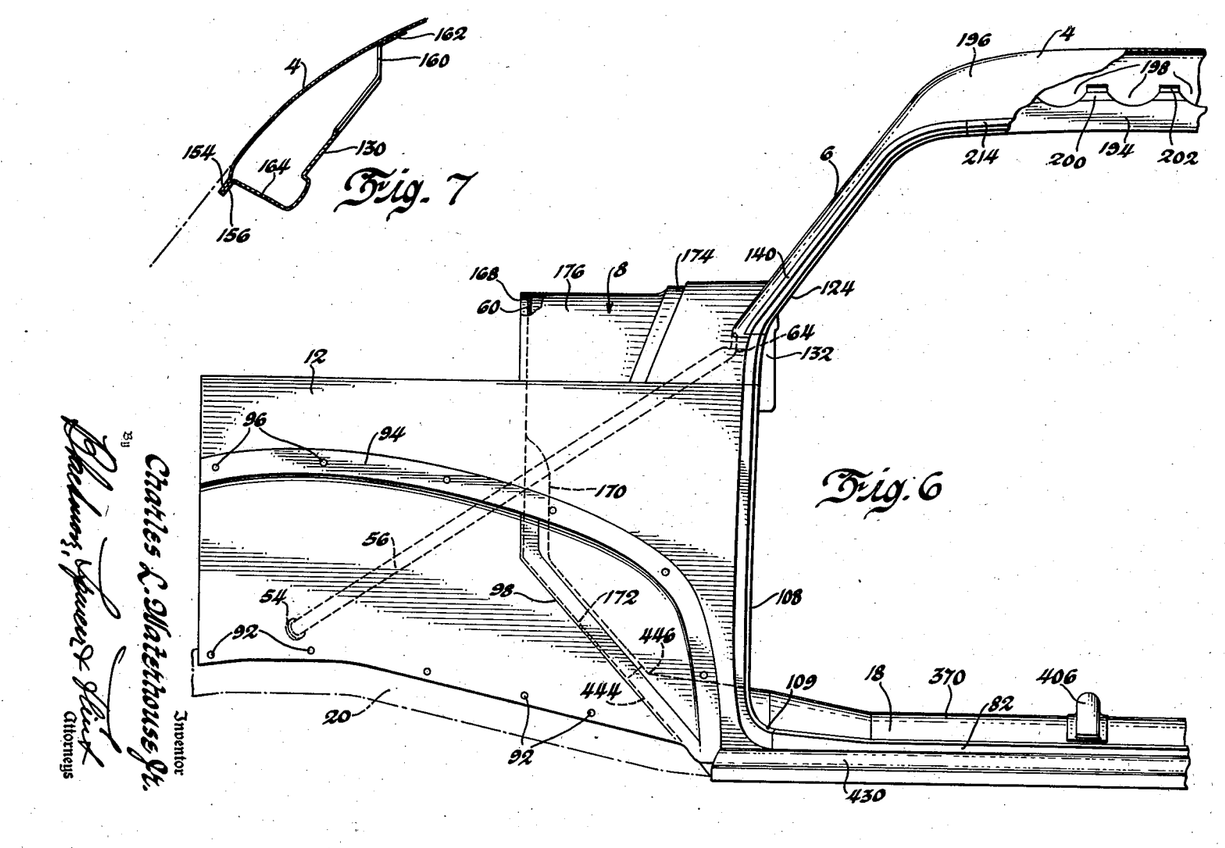
Figure 6 is an enlarged view of the front of the body, parts being broken away better to illustrate the construction.
Figure 7 is a sectional detailed view on the line 7—7 of Figure 12.

In Figure 6 the cowl sides 12 are shown as provided with openings 92 for the reception of bolts to fasten the cowl sides 12 to the frame 20. Instead of bolts passing through openings 92 and corresponding openings in the frame 20, the parts may be spot welded at 92. The cowl panels 12 are suitably shaped at 94 to form a shoulder and a flange (Figure 12) and against the flange of this shaped part the front fender is positioned and secured, suitable openings 96 being provided for the reception of bolts which will pass through a flange on the front fender. The cowl sides 12 are further shaped at 98 to form a ledge for the end of the footboard.

The upper edge of each side cowl panel 12 of the cowl is provided with an inturned flange 100 (Figure 8) which mates with a corresponding flange 102 (Figure 21) on the cowl top 8 and these flanges are secured together as by welding rigidly to hold the construction together. The front edges of the side cowl panels are provided with flanges 99 and 101 which are secured to the radiator shell (not shown).

Figure 8:
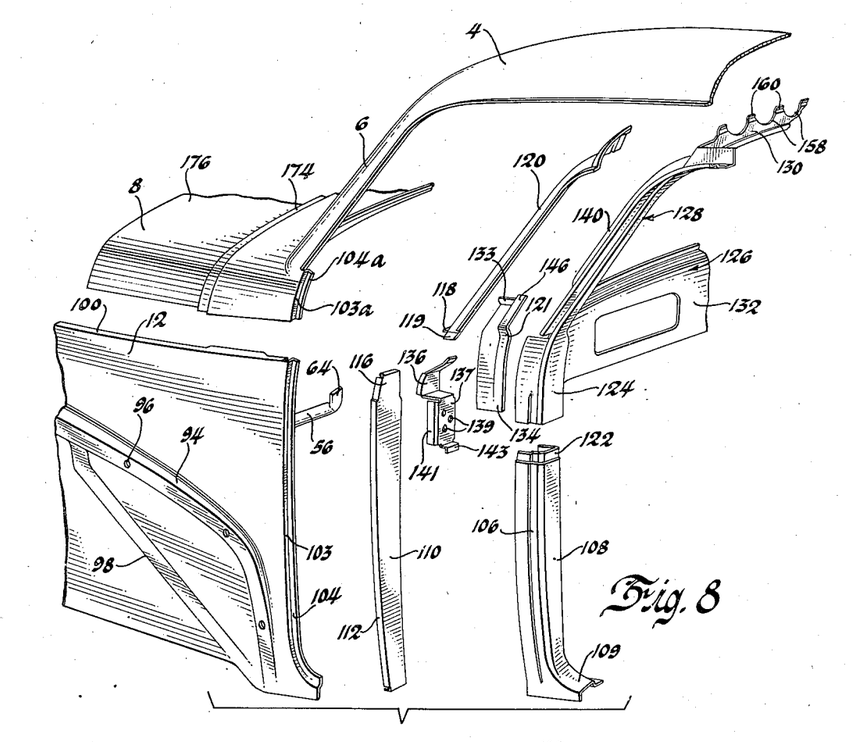
Figure 8 is an expanded view of the front end of the body disclosing particularly the details of the front pillar and the inside windshield panel.
Figure 10:
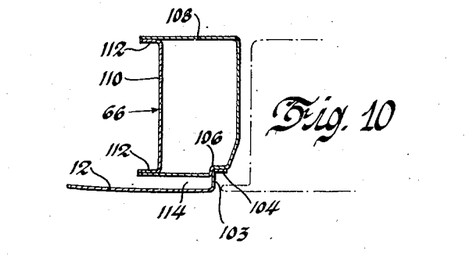

The rear edges of the cowl sides 12 are inwardly flanged as indicated at 103 in Figures 8 and 10, and this inwardly flanged part 103 is then flanged at right angles as at 104. The flanges 103 and 104 set or fit in a rabbet 106 formed in the edge of the front door pillar 66. The edge of the cowl top 8 has flanges 103a and 104a which are a continuation of the flanges 103 and 104 on the cowl sides 12.

Referring to Figures 8-11 inclusive, it will be seen that each of the front door pillars below the belt line is much wider transversely than above the belt line and comprises the channel shaped member 108 closed at its inside by the filler piece 110 and having a flared lower end 109 fitting over the sill 82. The filler piece 110 has its ends flanged as at 112 and these flanges are united as by welding to the ends of the channel 108 as is shown in Figure 10. Figure 10 also shows that the sides 12 of the cowl are spaced from the sides of the pillar 66 as shown at 114.

The upper end of the filler piece 110 is tapered as indicated at 116 and on the top of this tapered part there is secured one of the bottom flanges 118 of an inside windshield reinforcing and filler piece 120, which extends on an incline from the top of the filler 110 to the top 4. The manner in which the flange 118 is welded to the top of the filler piece 110 is best shown in Figure 4. A second flange 119 is secured inside the pillar at 121.

The upper part of the channel 108 is inwardly offset as indicated at 122 and over this offset part there is telescoped the lower end 124 of the inside windshield panel indicated as a whole at 126. This panel 126 comprises the inner lateral cap members 128 forming a part of the door post, the top transverse bracing or reinforcing member 130, and the instrument board 132. Part 126 is made of a single stamping and rigidly reinforces and braces the front part of the body at the windshield.

Figure 9:
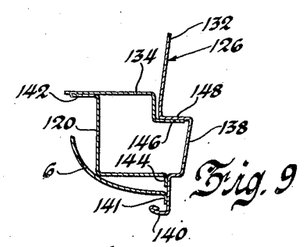
Figures 9, 10, and 11 are sectional details of the front door pillar on the corresponding lines of Figure 1.

A short filler piece 134, of the shape shown in Figures 8 and 9, is used to bridge the inside of the front pillar at the telescopic lower end 124 and extends from the offset part 122 upwardly along the windshield cap member 128, to the top of the instrument board 132. The filler piece 134 is suitably shaped to fit the adjacent parts and all parts are secured as by welding. The flange 133 conforms to the corner of the windshield. The instrument board is curved in plan with the middle extending into the vehicle.

Inside the front post at the point where the end 64 of the tube 56 meets the post a bracket 136 is secured as by welding. This bracket has an extension flange 137 provided with openings 138 to which one of the hinges of the door is secured. The extension has the lateral flanges 141 and the bottom angular flanged part 143 which is secured to the inside of the front door post. The position of this bracket in the post is best shown in Figure 4 and is for the additional purpose of strengthening the point of attachment of the tube end 64 of the top to the front post.

Referring to Figure 9, it will be noted that the inside reinforcing panel 126 is suitably shaped at its edge to form a channel 138 and the end of this channel extends outwardly beyond the cowl top 8 and is suitably shaped as at 140 to form a drip channel or rain trough. The windshield side 6 at this point is flanged as indicated at 141 and this flange is secured in the rain trough 140. The inner cap member 120 is angularly shaped and has its ends flanged at 142 and 144 and these flanges are secured respectively to the filler piece 134 and the flange forming the rain trough or drip channel 140. The filler piece 134 has a flange at 146 which is secured to the shoulder 148 formed on a part of the channel 138.

Figure 11:
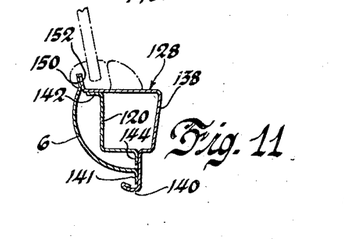

In Figure 11 the side header or cap piece 6 of the windshield has the lateral flanges 141 and 150, the flange 150 being welded to a flange 152 formed on the inclined upright member 128 of the inside reinforcing panel 126. The flanges 142 and 144 on the filler piece 120 are suitably welded to the side 128 of the inner panel 126 as best shown in Figure 11.

Referring to Figures 7 and 8, it will be noted that the edge of the top 4 above the windshield is slightly inwardly flanged as indicated at 154 and to this flange there is secured a flange 156 formed on the bottom of the transverse header piece 130 of the panel 126. This header piece 130 has the cut out parts 158 which form fingers 160 which are suitably bent up against the inside of the top 4 and welded at 162 to the roof. The header 130 has the flange 164 which extends away from the roof so that the header 130 when secured to the roof edge forms therewith a box-sectioned construction.

Figures 12, 13, 14, 15, 16:
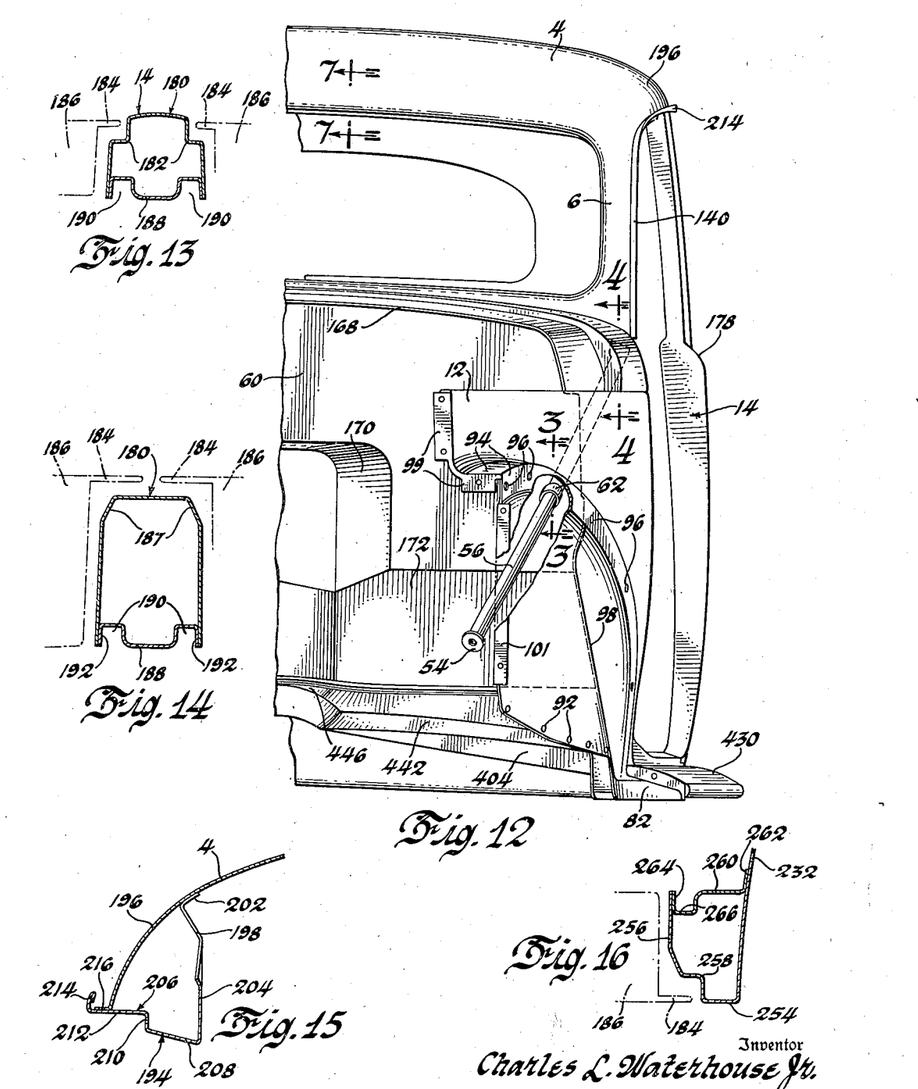
Figure 12 is a front view of one side of the body, parts being broken away better to illustrate details of construction.
Figures 13, 14, 15, and 16 are sectional views on the corresponding lines of Figure 1.

Referring to Figures 6 and 12, it will be seen that the cowl is provided with a cowl pan or dash panel 60. This cowl pan is secured by means of its edge flange 168 to the adjacent parts comprising the cowl top 8 and the cowl sides 12. This pan has the indented part 170 pressed from the outside toward the inside of the body, this indented part being to give clearance to and to accommodate certain parts of the engine. The pan 60 has the inclined part 172 to form the toeboard at the front of the vehicle.

The cowl top is downwardly offset at 174 to receive the edge of the hood door and has a further forwardly projecting downwardly offset part 176 which extends underneath the hood door.

Referring to Figures 13 and 14, the shape of the center pillar 14 is shown. This pillar is narrower at its top than at its bottom and at substantially the belt line of the vehicle the lower part of the post is given an outward bulge as indicated at 178. The pillar comprises the outer channel shaped member 180 provided with the rabbets 182 in the upper part to receive the overlap flanges 184 of the doors 186. The lower part of the door post has the edges on an angle or incline as shown at 187. Inside the vehicle the channel 180 is closed by the filler piece 188, this filler piece having the grooves or channels 190 formed therein for receiving a tacking strip to which to secure the upholstery. This filler strip 188 is secured to the ends of the channel 180 by welding the flanges 192 to the ends of the channel 180.

Referring to Figures 1, 6, and 15, it will be seen that the body rail over the top of the door comprises the inner reinforcing or strengthening strip 194 and the outer curved edge panel 196, this panel 196 having the top 4 as a continuation thereof. The strip 194 has the cut outs 198 which form the tongues 200 which are secured by welding the end flange 202 to the underside of the panel 196. The member 194 has the vertically extending part 204 and the more or less horizontally extending part 206. The part 206 has the inclined web 208, the vertical web 210 and the horizontal web 212. The top edges of the doors 186 are stepped to strike against the horizontal part 206 and to conform to the webs 208, 210, 212 to form a convenient interfitting connection. The web 212 is continued outwardly beyond the edge of the panel 196 and is upwardly turned as at 214 to form a drip channel or rain trough, a continuation of the drip trough 140. The flange 216 at the edge of the side panel 196 is welded in the drip channel 214.

Figures 17, 17A:
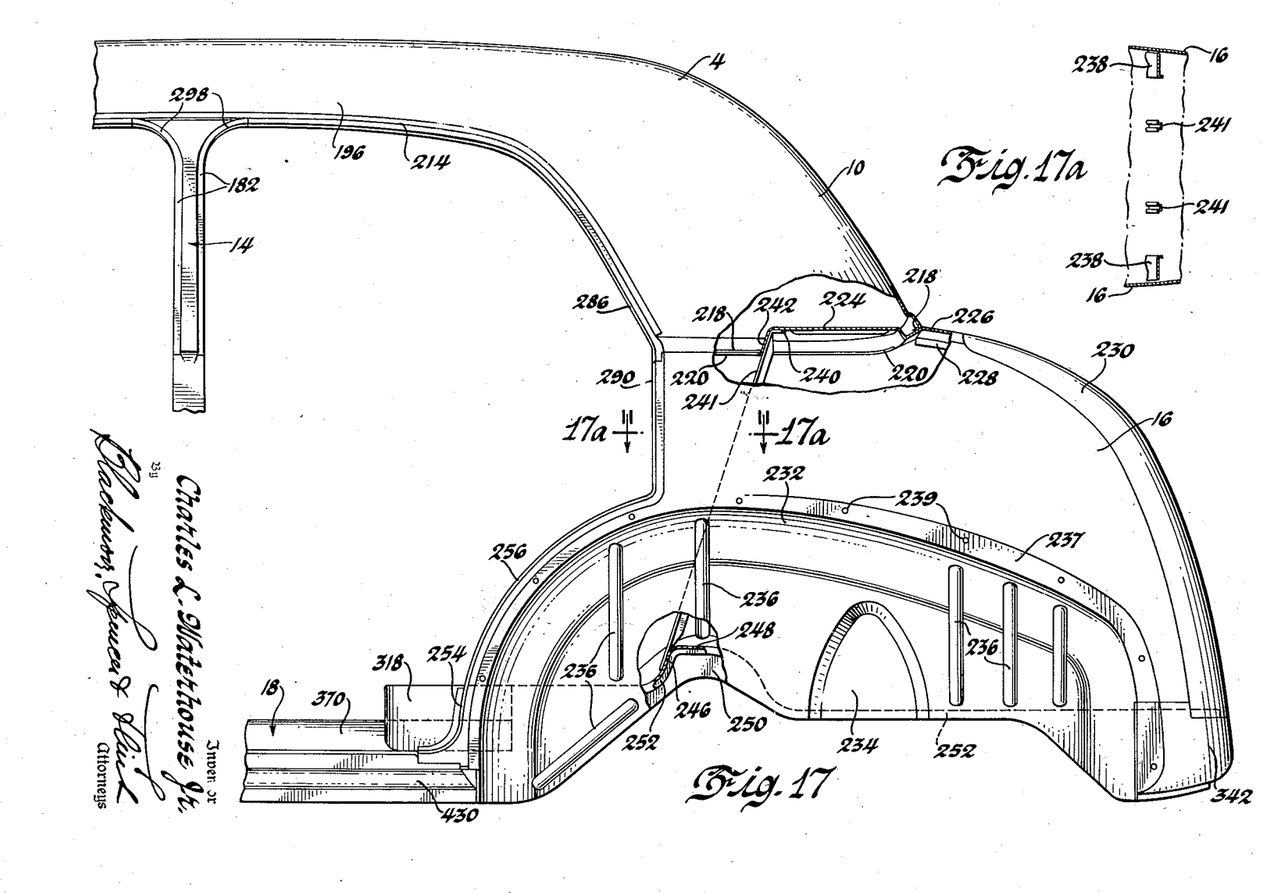
Figure 17 is an enlarged view of the rear part of the body with parts broken away and shown in section better to illustrate details of construction.
Figure 17a is a section taken on the line 17a—17a of Figure 17.

Referring to Figure 17 there is shown the roof 4 and the rear quarter panel 10 integral therewith and extending downwardly to the belt line of the vehicle. At the belt line the rear quarter panel 10 has the flange 218 (see Figures 20 and 21) which is united to a wider flange 220 on the rear side panels 16 and on the flanges 220 there is positioned the flange 222 on the edge of a tray 224 which extends across the rear of the vehicle at the top of the rear seat back. Between the flanges 218 and 220 at the rear of the vehicle there is secured the transverse filler piece 226 which has the edge flanges 228 which are secured to the inwardly turned flanges 220 on the side panels 16. The filler piece 226 is preferably integral with the tray 224, but may be constructed as a separate piece.

The side panels 16 at their lower sides are secured as by welding to the underpan 18; and the underpan, the side panels 16, and transverse piece 226 form a luggage compartment at the rear of the vehicle which is adapted to be closed by a door 230.

The rear panels 16 have the inwardly pressed wheel houses 232 and each wheel house in turn is provided with the outwardly pressed part 234 to accommodate the shock absorber. Suitable strengthening ribs 236 are formed in the wheel houses to strengthen the construction. The wheel houses are also shaped as at 237 to receive a flange on the rear fenders. The fenders are secured at the openings 239.

Figure 18:
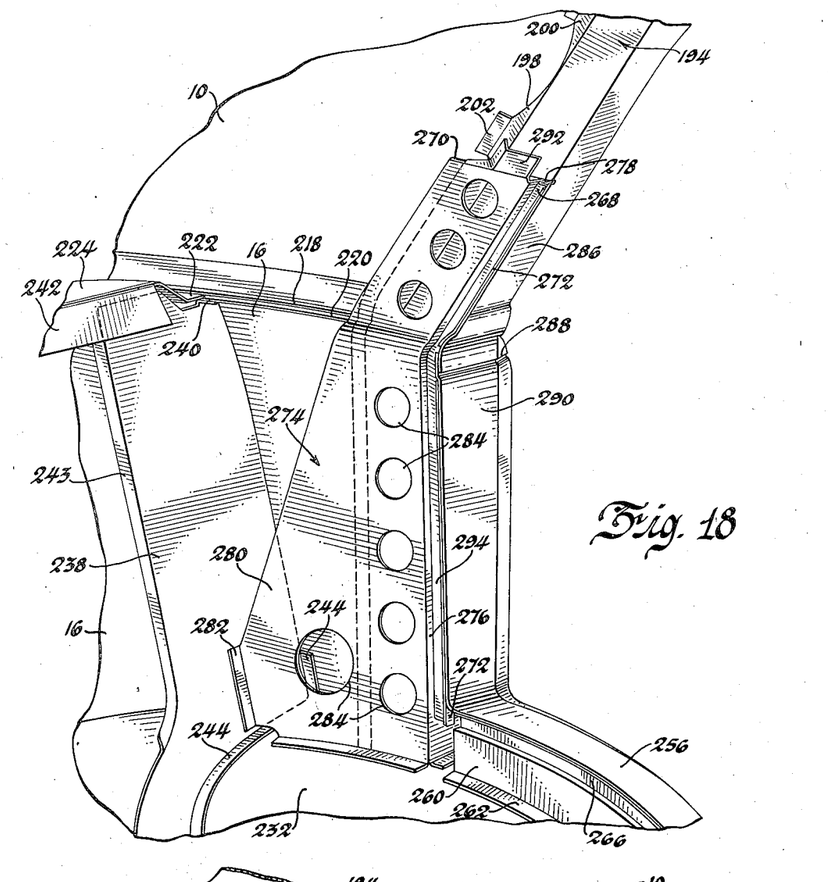
Figure 18 is a perspective view of a part of the rear door post.

Referring to Figures 17 and 18, the rear panels 16 at the inside have secured thereto the inclined lateral upright seat back supporting plates 238, these plates extending substantially from the belt line of the vehicle to the underpan 18 as is best shown in Figure 17. At the top the plates 238 are rearwardly flanged, similarly to the flange indicated at 240 on the center rib 241 to support the seat back. The flanges 240 are received under the edge of the shelf 224, the shelf in turn having the flange 242 bent downward at its forward edge and overlapping the top of the supporting plates 238. The parts are secured together by welding. At their sides the plates 238 have the flange 243 and at their lower ends they are secured by means of the flange 244 to the wheel house 232. The center rib at its extreme lower end is secured to the edge 246 of a channel 248 formed in the underpan 18. The upwardly bent channel 248 is to accommodate the rear axle and has a protuberance 250 at the middle thereof to accommodate the differential housing.

Figure 25:
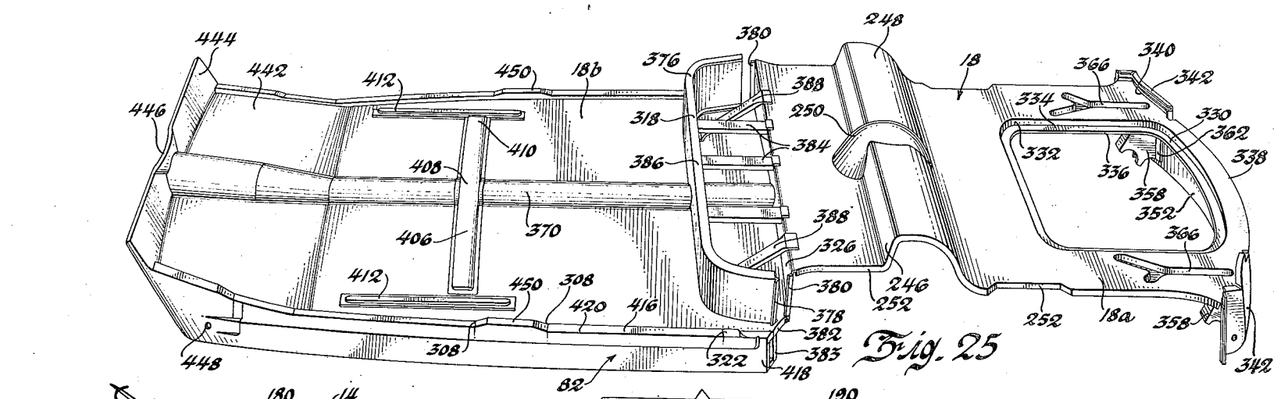
Figure 25 is a perspective view of the underpan.

As is best seen in Figures 17 and 25, the sides of the rear end of the underpan 18 have the downwardly bent flanges 252 to which the lower ends of the side panels 16 are secured as by welding.

Referring to Figures 1, 16, 18, 19, 23, and 24, there is disclosed the rear door pillar. The sections of this pillar vary as will be seen from an examination of the sectional views of Figures 16, 23, and 24. In Figure 16 the wheel house 232 is inwardly bent to form the web at 254 and then reversely bent to form part 256 which forms a channel with the wheel house 232, there being a rabbet 258 formed at the edge to accommodate the overlap flange 184 of the door 186. The channel formed by the wheel house 232 and the flanged parts 254 and 256 is closed by the closure piece 260 having flanges 262 and 264 which are welded to the wheel house 232 and to the flange 256 respectively. The closure piece 260 is provided with the groove 266 for the reception of a tacking strip to which to attach the upholstery.

Figures 19, 20:
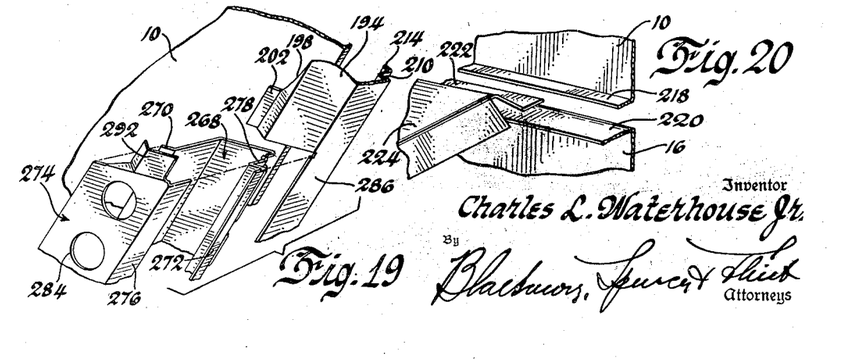
Figure 19 is an expanded view of a part of the rear door post construction.
Figure 20 is an expanded view of the connection between the rear quarter panel of the top, the rear side panel, and the tray over the rear seat.

From the expanded view of Figure 19 the post section at the upper inclined part of the door post is shown. This post section comprises the channel shaped element 268 having the inner flange 270 and the outer flange 272. This channel 268 is closed by the inner reinforcing closure piece 274 having a flange 276 which faces the side 278 of the channel 268 and is secured thereto by welding. The flange 270 is welded to the edge of the closure piece 274. The closure strip 274 has a wing 280 extending rearwardly thereof and a flange 282 on this wing is secured to the rear seat back supporting panel 238. The closure strip 274 provided with suitable holes 284 to enable the application of welding equipment. The inner part 194 of the upper body side rail (Figures 6 and 15) extends rearwardly and downwardly to form a part of the rear door post. This part 194 has the extension 286 which extends downwardly and overlaps the upper part of the channel 268 and the filler piece 274 and extends downwardly to the line 288 where it joins onto the inwardly turned flange 290 formed from the rear side panel 16. The side panel 16 is offset at its upper part to receive the end of the strip 286 to form a smooth surface. The top of the filler piece 274 is shaped as shown at 292 to be received over and secured to the correspondingly shaped end part of the member 194 as is shown in Figure 18. The flange 272 is spaced from the flange 276 of the filler piece 274 to form a groove 294 to receive a tacking strip for the upholstery.

Figures 21, 22, 23, 24:
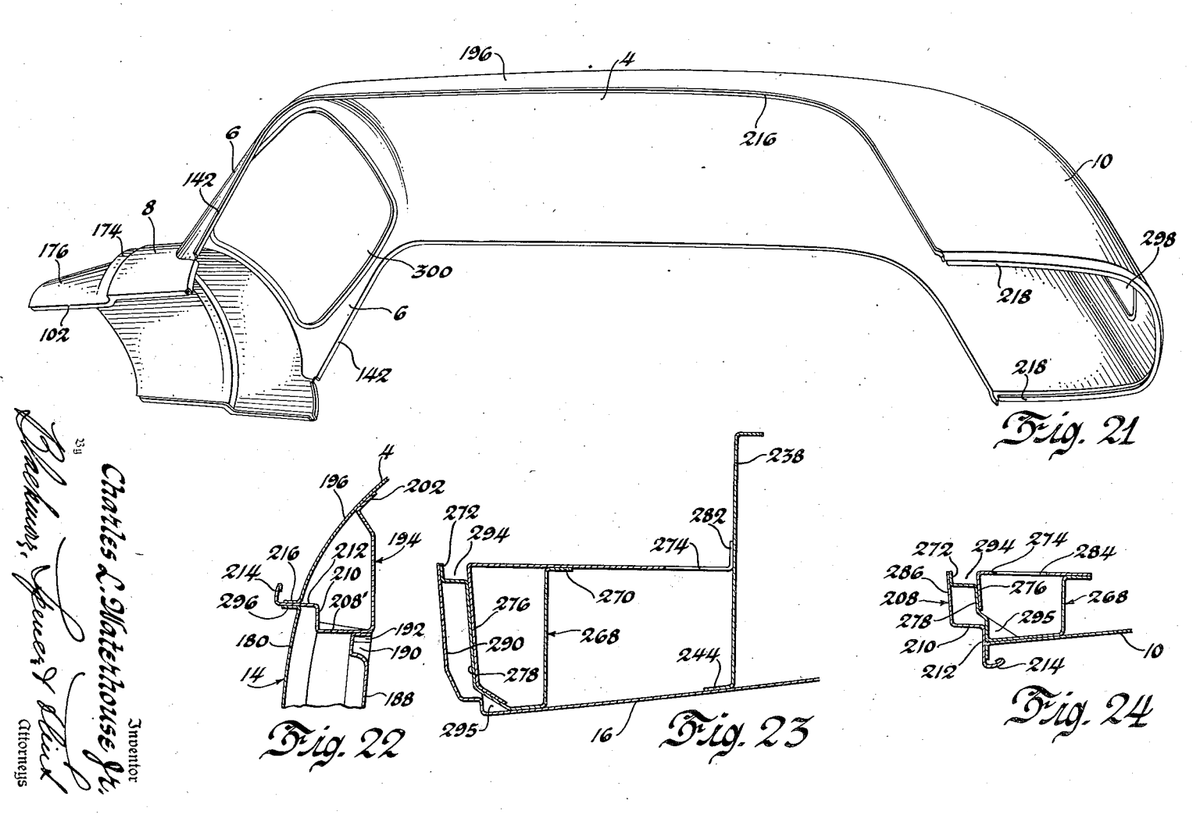
Figure 21 is a perspective view of the vehicle top construction.
Figures 22, 23, and 24 are sectional views on the corresponding lines of Figure 1.

Figure 24 shows the section of the door post immediately above the belt line. The part 286, forming a continuation of the reinforcing member 194, does not have parts 202 and 204 below the structure indicated at 292 at the top of the closure piece 274, but otherwise the general configuration of piece 286 follows the configuration of the reinforcing member 194. That is, the parts 208, 210 and 212 have the same general configuration as the corresponding parts in Figure 15. At suitable points along its length, the channel member 268 is provided with outwardly pressed parts 295 to locate the rear quarter panel 16.

In Figure 21 the integral top construction 4 is best shown. This roof stamping comprises the roof part proper 4, the upper door rail part 196, the rear quarter panels 16 having the window opening 298, the windshield frame side members 6 defining the windshield opening 300 therebetween, and the cowl top 8. The sides of the rear quarter section may each have a window opening if desired.

In Figure 22 the manner of attaching the top of the center post to the top rail is shown. The web 208' is flat instead of inclined as shown in Figure 15 and against the flat web 208' and the webs 210 and 212 the upper flared end of the post is adapted to abut. The post is welded in place by means of the outer flange 296 and at the inside at the flange 192. The lateral flared parts 298 (Figure 17) are welded to the webs 208' and 212.

Figures 26, 27:
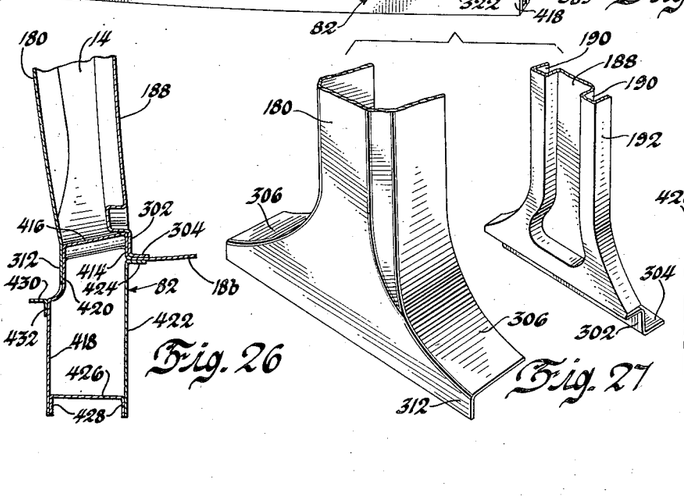
Figure 26 is a sectional view on the corresponding line of Figure 1.
Figure 27 is an expanded perspective view of the lower end of the center door post.
Figure 28:
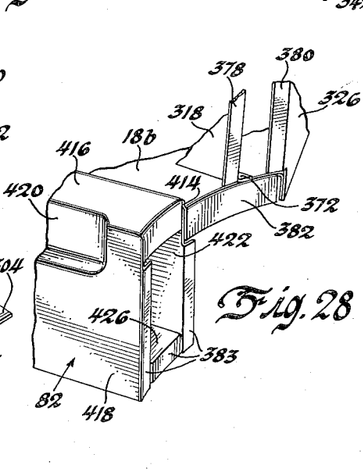
Figure 28 is a perspective view of a part of the underbody at the front of the wheel housing at the place where the rear door post joins the underpan.

In Figures 26 and 27 the manner in which the bottom of the center post is connected to the side sill of the underpan is shown. The bottom of the inside cap 188 of the post has a downwardly extending flange 302 and an outwardly extending flange 304 and these flanges 302 and 304 are welded to the adjacent parts of the underframe. The bottom of the channel 180 has the flared parts 306 which seat in depressions 308 (Figure 25) formed on the side sill 82 of the underpan 18. These flared ends 306 are welded where they seat in the depressions. The outer channel member 180 has the downwardly extending flange 312 which faces against and is welded to the outside of the sill 82.

In Figure 30 there is shown the manner in which the end of the wheel house 16 is secured to the side sill 82 of the underframe. The end of the inwardly bent part 254 of the wheel house is extended as shown at 314 and flanged at 316 where it is welded to a seat support 318 which is secured to the underpan as is best shown in Figure 25. The lower end of the inwardly turned part 254 of the side panel 16 is formed into channel shape as indicated at 320 and this channel shaped part fits over the corresponding upper channel shaped part of the sill 82. The sill is countersunk as indicated at 322 in Figure 25 to receive the end of the panel 320. A second inner channel terminal part 324 seats on the floor of the underpan between the raised edge of the sill and the seat support 318.

Figures 37, 38:
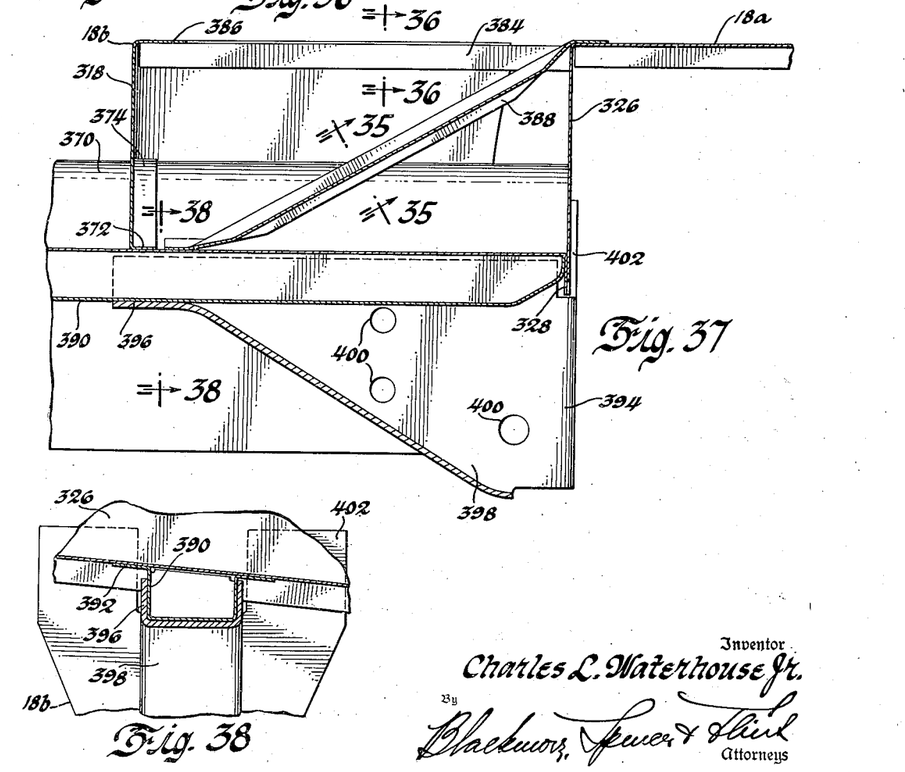
Figure 37 is a sectional detailed view on the corresponding line of Figure 31.
Figure 39:
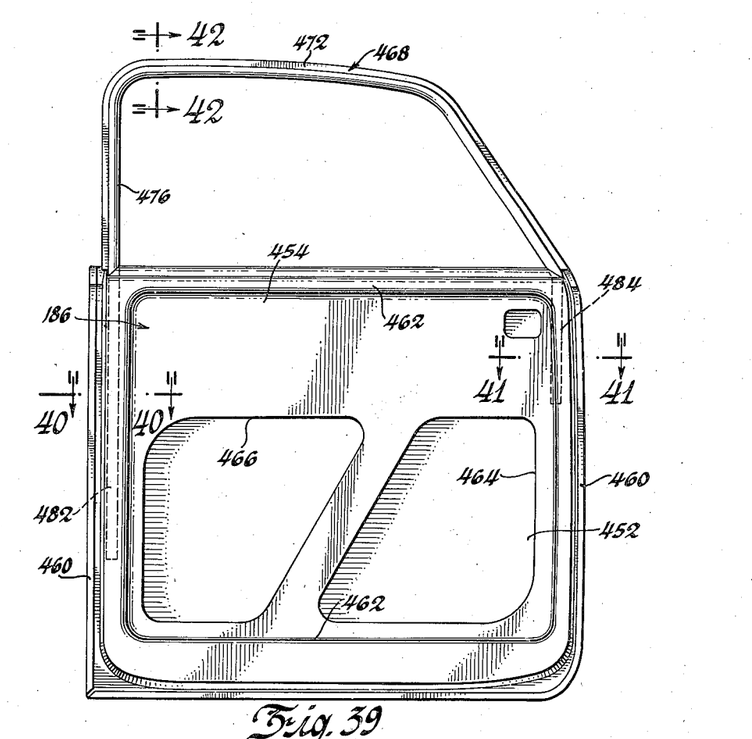
Figure 39 is a view of one of the front doors looking from the inside.

Referring to Figures 25, 28, and 31–38 inclusive, the underpan is shown in detail. This underpan 18 comprises the rear section 18a and the front section 18b. The rear section terminates in a downwardly extending flange 326 below the rear seat. This flange is secured to a flange 328 on the end of the front section 18b as is best shown in Figure 37. Intermediate its ends, the rear section has the opening 330 in which the gasoline tank is received, the edge of this opening being suitably downwardly and then outwardly flanged as indicated at 332, 334, and the edge of the flange 334 is again downturned as indicated at 336, these flanges adding strength to the edge of the opening. The rear pan extends to the rearmost part 338 and is curved in plan at its rear end. At the sides of the rearmost end the pan is upwardly flanged as at 340 (Figure 34) and is welded to a rear reinforcing curved plate 342 which extends the width of the vehicle at the rear. Intermediate its ends this curved plate 342 is inwardly bent as at 346 and then upwardly as at 348 and finally into a flange 350 which is welded to the end 338 of the rear section 18a. Underneath the section 18a there is secured a second plate 352 curved across the end of the vehicle and spaced from the plate 342. At its upper end this plate 352 has a flange 354 secured to the underside of the rear section 18a and at its lowermost edge is secured to a flange 356 formed in the bottom of the curved rear member 342, these members being spaced from each other and secured together at their lower edges, and at the top the spaced apart flanges are secured to the underpan, forming a box-sectioned construction adding strength to the rear edge.

Two brackets 358 are secured to the rear end of the underpan and serve as mountings for the spring shackles, the spring shackles being mounted at the arcuate part 360. These brackets have the flanges 362 by means of which they are secured to the plate 352 and they are also provided with the channel arms 364 which fit over inwardly pressed ribs 366 formed in the underpan, these channels 364 and ribs 366 being welded together.

Inside the box-sectioned construction formed by the plates 342 and 352, two reinforcing brackets 368 are secured. Openings 369 in the plate 342 and brackets 368 serve to mount the rear bumper.

The front section 18b is provided with a center channel 370 to accommodate the propeller shaft and this channel extends rearwardly and meets the downturned flange 326 on the rear section 18a. Immediately in front of flange 326 the seat support 318 is positioned and is secured by welding the lower inturned flange 372 (Figure 37) to the bottom 18b, the seat support having the arcuate part 374 to accommodate the channel 370. The seat support 318 has the arcuate ends 376 having the end flanges 378 which are secured to the rear wheel house 232. Similarly, flanges 380 on the ends of the flange 326 are secured to the wheel house. The rear section, where it meets the front section, is of less width and the corner of the front section 18b where the two sections meet is rounded as indicated at 382 to fit onto the rounded part of the wheel house. See Figure 28. Flanges 383 on the end of the sill 82 are also secured to the wheel house.

Figures 34, 35, 36:
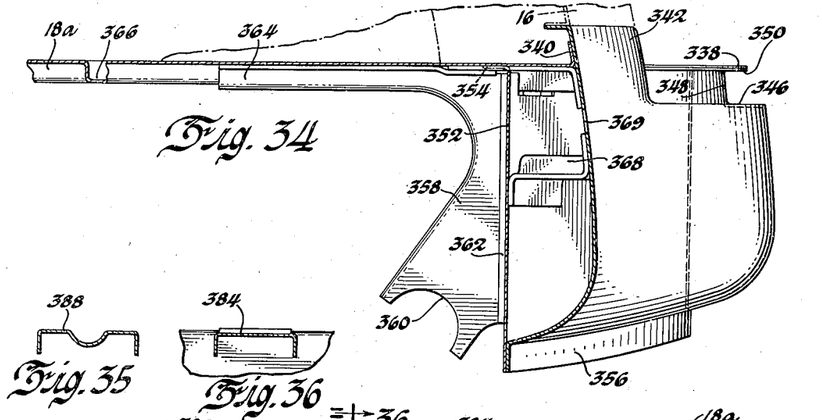
Figure 34 is a sectional view on the corresponding line of Figure 31.
Figures 35, 36, and 38 are sectional details on the corresponding lines of Figure 37.

Suitable braces 384 connect the top flange 386 of the seat support 318 with the rear section 18 and inclined braces 388 extend from the floor of part 18b upward to the rear section 18a and are welded to both. The cross sectional shape of the braces 384 and 388 is shown in Figures 36 and 35. respectively.

Underneath the rear end of the front section 18b suitable longitudinally extending channel shaped reinforcing members 390 and double channel members 391 are secured and the outermost of these channel reinforcing members extend up to the flange 326 of the rear section 18a. These channel members 390 and 391 have the lateral flanges 392 by means of which they are welded to the bottom of the underpan.

Spring shackle supporting brackets 394 are secured to the underside of the underpan, the brackets having the forward channel shaped parts 396 which fit over the channel 390, but at the rear the brackets 394 are enlarged and project downwardly a considerable distance as shown at 398 in Figure 38. The sides of part 398 are provided with suitable openings 400 by means of which the spring shackle is attached, and at their upper edges these sides 398 abut against the channels 390 and are welded thereto. The rearmost ends of the brackets 394 have the flanges 402 which are turned outwardly and secured at the upper part to the flange 326.

Figures 31, 32, 33:
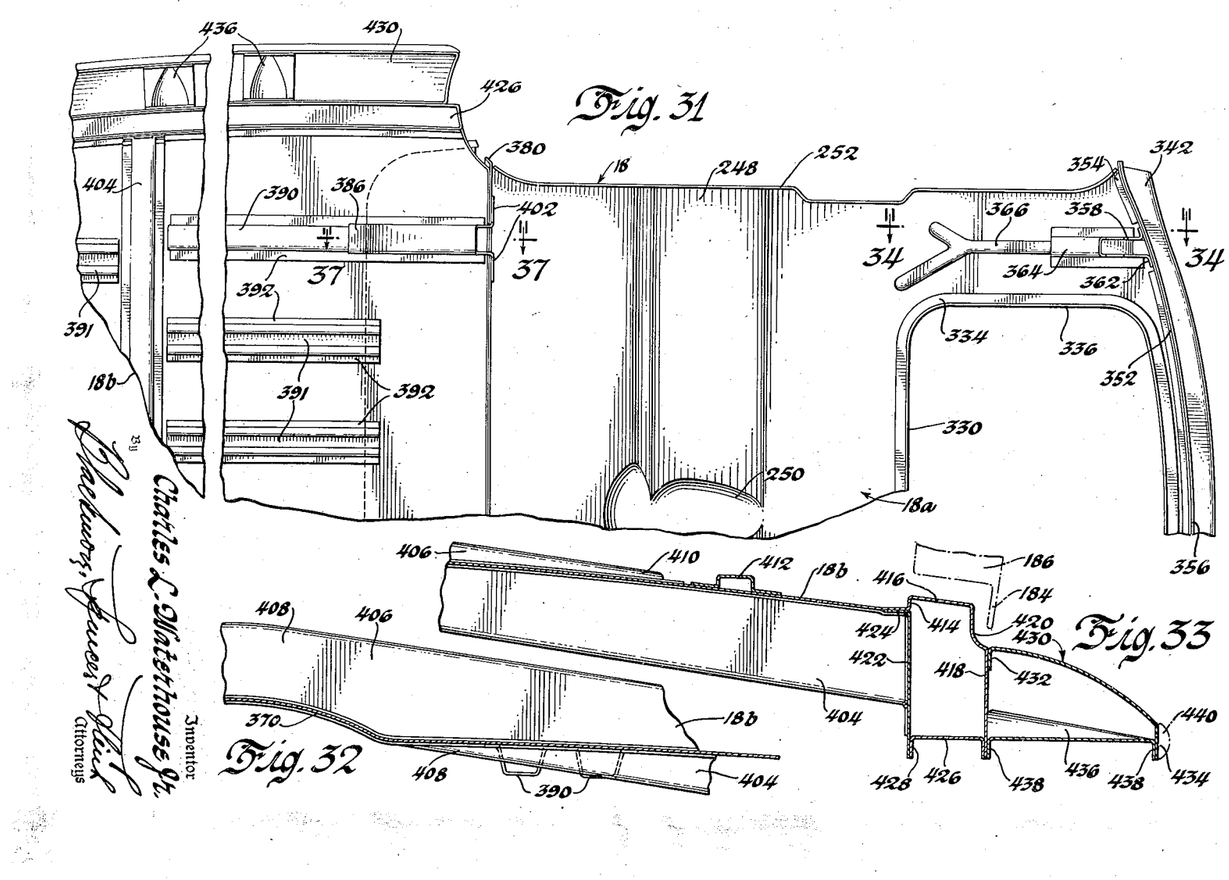
Figure 31 is a bottom plan view of one half of the rear part of the underpan.
Figures 32 and 33 are sectional views on the corresponding lines of Figure 1.

The front section is also provided with the lower transverse brace 404 and the upper transverse brace 406, these braces being positioned one over the other. The braces 404 and 406 are tapered and overlap each other as is best shown in Figures 32 and 33. The lower brace 404 is deepest at the outer part of the underpan and is shallowest at its inside at 408 where it meets and ends at the center channel 370. The upper brace 406 extends substantially entirely across the underpan and is deepest at its mid part 408 over the channel 370 and is shallowest as indicated at 410 where it approaches the edge of the underpan. Adjacent the front upper part of the underpan part 18b a little beyond the ends 410 of the brace 406, channel shaped tracks 412 are secured. On these tracks the rollers of the shiftable front seat are adapted to roll.

The shape of each lateral edge or sill of the underpan from the rear wheel housing forwardly to the toeboard is indicated in Figures 25, 26, 28, and 33. The edge of the pan is upwardly bent to form a web as shown at 414 and then outwardly as at 416, this outwardly bent portion being slightly downwardly inclined to conform to the inclined shape of the lower end of the door. The pan is then downwardly flanged as shown at 418, there being a rabbet 420 formed where the parts 416 and 418 join, the rabbet being to accommodate the overlap flanges 184 of the doors 186.

A longitudinally extending strip or plate 422 has an upper flange 424 secured to the underside of the underpan and this plate 422 extends downwardly so that the lower edge thereof is substantially coincident with the lower edge of the downwardly bent flange 418. The plate 422 is spaced from the flange 418 and the lower ends of the flanges are secured together by the channel member 426 the lateral flanges 428 of which are secured to the lowermost edges of the flange 418 and plate 422. It will be noted that the flange 424 is secured to the underpan so as to bring the plate 422 in alignment with the web 414. The structure of parts 414, 416, 418, 422, and 426 forms a box section and makes a very rigid construction at the side of the underpan and forms the sill 82.

To the outer flat face of the flange 418 there is secured the imitation running board 430, the element 430 being secured by means of the flanges 432. An outer flange 434 on the imitation running board 430 is connected to the end of the downwardly turned flange 418 by means of a plurality of reinforcing and strengthening members 436, the members 436 being secured by means of end flanges 438 to their adjacent parts. A decorative molding strip 440 is shown secured to the outer flattened edge of the imitation running board 430. If desired, this running board 430 may be omitted.

The forward end of the underpan has an upwardly inclined part 442 and at the end of the part 442 there is an upwardly bent flanged end 444 which is in line with the toeboard 172 of the vehicle. This upwardly bent part 444 has the central curved part 446 which mates with and conforms to the indentation 170 of the dash pan 60.

The opening shown at 448 is for the reception of the bolt 80 shown in Figure 5.

The side sills 82 have the upwardly projecting parts 450 intermediate their length and on these parts 450 the center door posts 14 are mounted.

The outer skin of the body comprises the cowl cover 8, the roof construction 4, the cowl sides 12, and the rear side panels 16.

Figure 40:
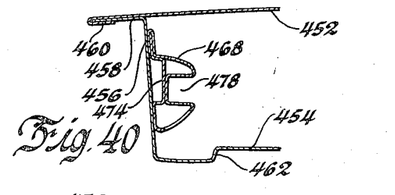
Figures 40, 41 and 42 are sectional detailed views on the corresponding lines of Figure 39.
Figure 41:
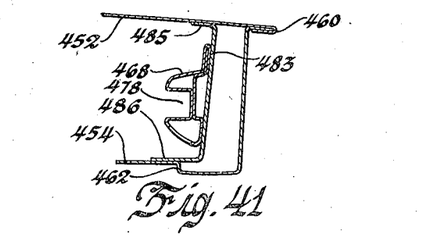
Figure 42:
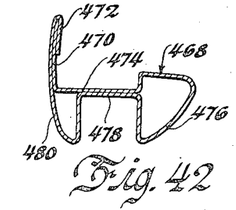

In Figures 39–42 inclusive, one of the doors 186 of the vehicle is shown. Except for their peripheral shape these doors are substantially identical and a description of one will serve for both front and rear doors, in this instance one of the front doors being shown. The door comprises the outer panel 452 and the inner panel 454. The inner panel has the edge flanges 456 to form the jamb face of the door and a second flange 458 bent away from the flanges 456 and received within the turned over edge 460 of the outer panel 452. The flange 458 and the abutting edge part and turned over flange 460 form the overlap flange of the door. The panel 454 is indented at 462 to give strength to the structure, and has the cut out parts 464 and 466 to lighten the construction and to allow access to the window and window regulator mechanism. The panels 452 and 454 extend from the bottom of the door to substantially the belt line only and above this belt line the door is composed of the single integral rib 468 bent to the general configuration shown in Figure 42. The cross sectional shape of the rib 468 is shown in Figures 40, 41, and 42. One edge 470 is return bent around the other edge 472 to form a rigid interconnection and closed structure. Beyond the flange 372 a recess 474 is provided, this recess being of the shape shown and is adapted to receive a weatherstrip so that a tight connection will be formed between the upper part of the door and the pillar when the door is closed. The overlap flange of the upper part of the door is formed by the edges 470 and 472. The inner surface of the rib 468 is indicated at 476 and a channel 478 is formed in the rib and faces inwardly of the door to form a glass run channel. The outer surface of the rib is indicated at 480. The rib is at first in flat form and is bent to the general cross-sectional shape shown in Figure 42. It is later suitably bent to the contour shown in the door of Figure 39 and has one long arm 482 at one side of the door and a short arm 484 at the other side, these arms being suitably welded to the jamb face 456 at the side having the longer arm 482 and to a reinforcing channel 483 secured to the door at the shorter side shown to the right in Figure 39. The channel 483 is secured by means of the flanges 485 and 486 to the outer and inner channels respectively and serves as a mounting bracket for the door hinges.

Figure 43:
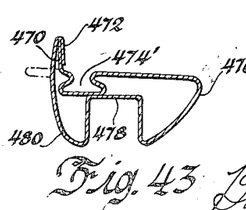
Figure 43 is a view, corresponding to Figure 42, of a modification.

A modified cross-sectional shape is shown in Figure 43. The only difference is in the shape of the weatherstrip retaining groove 474 of the species of Figures 39–42. The groove 474' of Figure 43 has the shape as shown.

I claim:

1. In a metal vehicle body having a cowl pan, two front pillars and a front frame, two braces, one at each side of the vehicle, said braces extending from the frame to the pillars, said braces passing through the cowl pan and being welded to the pillars, and a yieldable connection between the braces and the frame.

2. In a vehicle body having a cowl pan, hollow front door pillars and a frame, two braces, one at each side of the vehicle, said braces extending from the frame to the pillars, brackets secured in the front pillars, said braces passing through the cowl pan and being welded to the pillars at the point where the brackets are secured, and a yieldable connection between the braces and the frame.

3. In a metal vehicle body having front door pillars and an underpan terminating substantially at the front door pillars, a short subframe extending from the end of the underpan forwardly under the vehicle to the front end thereof, and a resilient connection between the end of the frame and the end of the underpan.

4. In a metal vehicle body, a front end and front door pillar construction comprising an inner panel extending from the roof to the belt line, said panel including an instrument panel, inner pillar cover and top reinforcement above the windshield, an outer skin including a roof and cowl and forming the exterior of the pillar and body, inner members extending from the roof to the bottom of the body and forming the interior members of the pillar, said members forming a joint at substantially the belt line of the vehicle and being secured together.

5. In a metal vehicle body, a rear door pillar construction comprising a channel member, an outer skin to the edge of which the channel member is secured, an inner cap piece closing the channel and forming therewith a box-sectioned construction, a seat back support secured to the outer structure, said cap piece having a part extending rearwardly and secured to the seat support, the edge of said channel being spaced from the cap piece to form a channel to receive a tacking strip, the edge of said outer skin being inwardly bent and secured to the channel member to form the edge face of the pillar.

6. In a metal vehicle body, a rear door pillar construction comprising a channel member, an outer skin to the edge of which the channel member is secured, an inner cap piece closing the channel and forming therewith a box-sectioned construction, the edge of said channel being spaced from the cap piece at the edge thereof to form a channel to receive a tacking strip, a roof rail having an extension at its rear end, said extension having an end cap piece or facing for the pillar, said edge cap piece having a part extending beyond the edge of the body and formed into a drip trough, said outer skin secured at its edge in the trough.

7. In an underpan for a metal vehicle body, said pan extending from the rear end of the vehicle to the front part of the cowl, said pan comprising two parts, the rear part extending from the rear end of the vehicle to adjacent the rear door post and having its forward end downturned and joined to the rear of the front part, a seat support secured to the front part adjacent the junction of the two parts and having its upper edge substantially in the same plane as the rear part of the underpan, braces extending between the seat support and the rear part and between the front and rear parts, a center channel in the pan to accommodate a propeller shaft, transverse bracing for the pan, said bracing comprising members cooperating with each other and positioned above and below the underpan, and an upturned edge at the front of the pan.

8. In a metal vehicle body having front door pillars and an underpan terminating substantially at the front door pillars, a short subframe extending from the end of the underpan forwardly under the vehicle to the front end thereof, a resilient connection between the end of the frame and the end of the underpan, braces extending from the front part of the frame to the body, a resilient connection between the frame and one end of each brace, and means to connect the other end of the braces to the body.

9. In a vehicle body having an underpan, bracing or stiffening means for the underpan, said means comprising an upper transverse brace tapering from the middle of the underpan toward the edge of the pan, and a lower transverse brace tapering from the outer edge of the pan toward the middle thereof, said braces being positioned on the top and bottom of the pan opposite each other.

CHARLES L. WATERHOUSE, Jr.